(12) United States Patent  
Ohhashi et al.

(10) Patent No.: US 11,995,173 B2  
(45) Date of Patent: May 28, 2024

(54) SERVICE PROVIDING SYSTEM, APPLICATION USAGE METHOD, AND INFORMATION PROCESSING SYSTEM

(71) Applicants: Hideki Ohhashi, Saitama (JP); Yasuharu Fukuda, Kanagawa (JP)

(72) Inventors: Hideki Ohhashi, Saitama (JP); Yasuharu Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 221 days.

(21) Appl. No.: 17/340,319

(22) Filed: Jun. 7, 2021

(65) Prior Publication Data

US 2021/0382981 A1    Dec. 9, 2021

(30) Foreign Application Priority Data

Jun. 9, 2020    (JP) ................. 2020-100327

(51) Int. Cl.
| | |
|---|---|
| G06F 21/60 | (2013.01) |
| G06F 9/50 | (2006.01) |
| G06F 21/31 | (2013.01) |
| G06F 21/44 | (2013.01) |
| G06F 21/30 | (2013.01) |
| H04L 29/06 | (2006.01) |

(52) U.S. Cl.
CPC ............ G06F 21/445 (2013.01); G06F 21/31 (2013.01)

(58) Field of Classification Search
CPC ........ G06F 21/445; G06F 21/31; G06F 21/45; G06F 2221/2115; G06F 2221/2117
See application file for complete search history.

(56) References Cited

U.S. PATENT DOCUMENTS

| | | |
|---|---|---|
| 2014/0123240 A1 | 5/2014 | Seo et al. |
| 2015/0264039 A1 | 9/2015 | Fukuda |
| 2016/0125173 A1 | 5/2016 | Ohzaki et al. |
| 2016/0125177 A1 | 5/2016 | Kashiyama et al. |

(Continued)

FOREIGN PATENT DOCUMENTS

| | | | | |
|---|---|---|---|---|
| EP | 3792793 A1 * | 3/2021 | ............ | G06F 21/30 |
| JP | 2014-134978 | 7/2014 | | |

(Continued)

OTHER PUBLICATIONS

Supun Nakandala; Hasini Gunasinghe; Suresh Marru; Marlon Pierce; "Apache Airavata security manager: Authentication and authorization implementations for a multi-tenant escience framework"; 2016 IEEE 12th International Conference on e-Science (e-Science); Sep. 2016; Publisher: IEEE; pp. 287-292 (Year: 2016).*

(Continued)

*Primary Examiner* — Fatoumata Traore  
*Assistant Examiner* — Courtney D Fields  
(74) *Attorney, Agent, or Firm* — IPUSA, PLLC

(57) ABSTRACT

A service providing system, an application usage method, and an information processing system. The service providing system receives from the terminal device, a request for registering a user to a second tenant in which the user can use the application, the request designating identification information of the user registered in the first tenant and identification information of the application, and registers the user and the application in the second tenant as a user who can use the application.

10 Claims, 11 Drawing Sheets

(56) References Cited

U.S. PATENT DOCUMENTS

| | | | |
|---|---|---|---|
| 2016/0127349 A1* | 5/2016 | Nakajima | H04L 63/083 |
| | | | 726/6 |
| 2016/0127356 A1 | 5/2016 | Fukuda et al. | |
| 2017/0041504 A1* | 2/2017 | Fukuda | H04L 63/0807 |
| 2017/0054684 A1 | 2/2017 | Ohzaki et al. | |
| 2017/0063871 A1 | 3/2017 | Kashiyama et al. | |
| 2017/0149788 A1 | 5/2017 | Ohzaki et al. | |
| 2018/0121646 A1 | 5/2018 | Sakanashi et al. | |
| 2018/0268124 A1 | 9/2018 | Ohzaki et al. | |
| 2020/0293632 A1 | 9/2020 | Uchibori et al. | |
| 2021/0377277 A1* | 12/2021 | Soneda | H04L 63/104 |

FOREIGN PATENT DOCUMENTS

| | | |
|---|---|---|
| JP | 2015-109015 | 6/2015 |
| JP | 2018-136852 | 8/2018 |
| JP | 2018-156128 | 10/2018 |

OTHER PUBLICATIONS

Japanese Office Action for JP2020-100327 dated Jan. 23, 2024.

* cited by examiner

Account

Please input login information.

←sample@example.com

Tenant ID  *331
[           ]

User ID  *332
[           ]

Password  *333
[           ]

*334
[ Login ]

Forgot password?

Privacy policy
License

Account

Please input login information.

Email Address  *336
[ sample@example.com ]

Password  *333
[           ]

*334
[ Login ]

Check other login method.
Forgot password?

Privacy policy
License

SERVICE PROVIDING SYSTEM, APPLICATION USAGE METHOD, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application No. 2020-100327, filed on Jun. 9, 2020 in the Japan Patent Office, the entire disclosure of which is hereby incorporated by reference herein.

BACKGROUND

Technical Field

The present disclosure relates to a service providing system, an application usage method, and an information processing system.

Related Art

Information processing systems that provide services using applications to users through networks are known. By preparing a certain environment such as a terminal device or an electronic device such as a personal computer (PC) and a web browser that operates on the terminal device or the electronic device, the users can use the services provided by a web application on the information processing system with the terminal device or the electronic device.

In some cases, a company, or the like contracts a service provided by such information processing system as an organization, and a member of the organization or the like uses the service as a user. Organizations that have contracted services are managed in a unit called tenant. In order for a user (employee of a company or the like) to use the service, the user needs to be registered in the tenant. For example, a tenant administrator may register the user in the tenant.

SUMMARY

Embodiments of the present disclosure describe a service providing system, an application usage method, and an information processing system. The service providing system receives from the terminal device, a request for registering a user to a second tenant in which the user can use the application, the request designating identification information of the user registered in the first tenant and identification information of the application, and registers the user and the application in the second tenant as a user who can use the application.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 9A and 9B are diagrams illustrating examples of login screens displayed by the first terminal device or the second terminal device;

Figure 1:
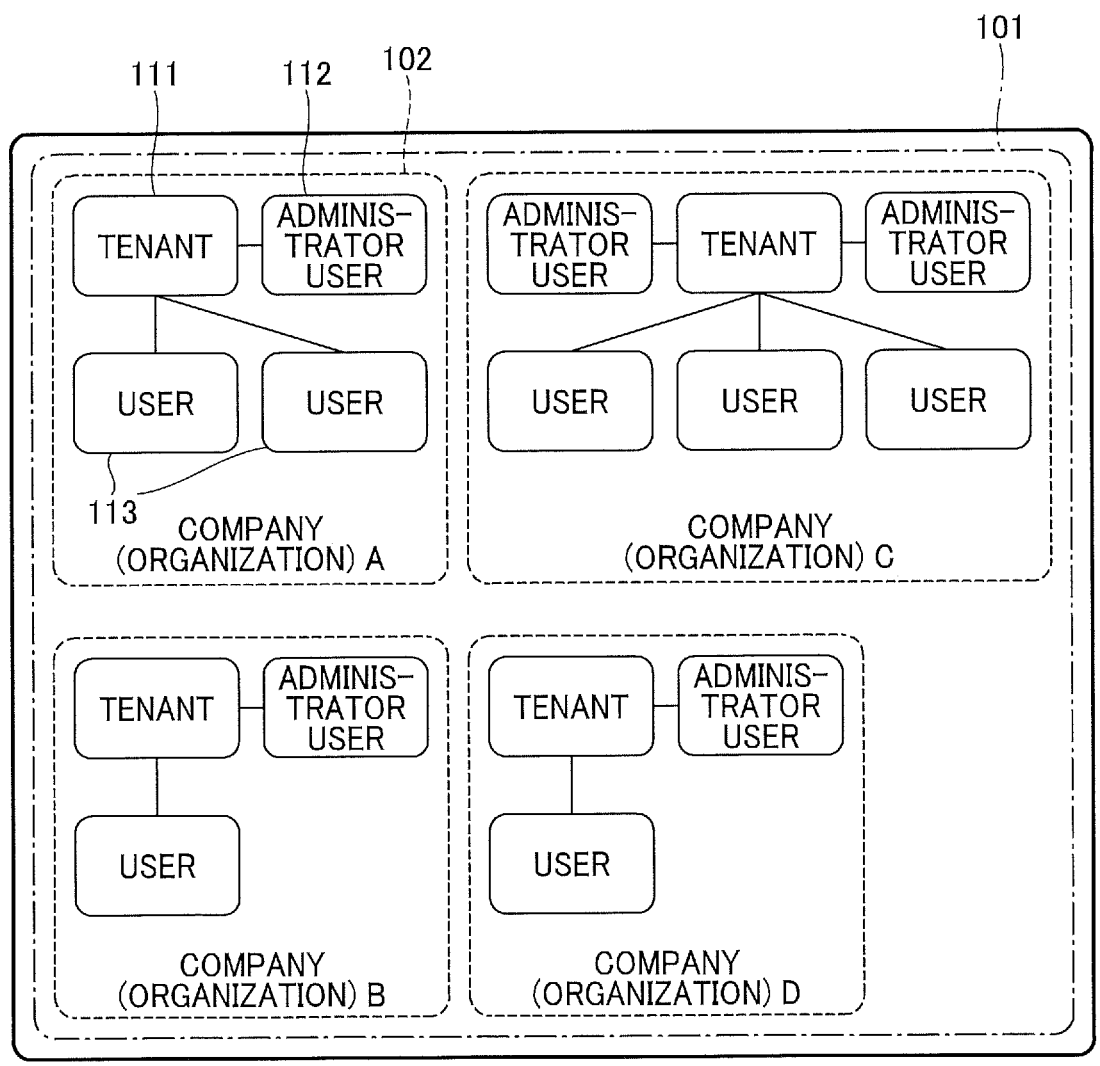
FIG. 1 is a block diagram schematically illustrating a structure of tenants in an organization.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, as an example of the embodiment for carrying out the present disclosure, a service providing system and an application usage method performed by the service providing system is described.

A relationship between the organization and the tenant is described with reference to FIG. 1. FIG. 1 is a block diagram schematically illustrating a structure of tenant in an organization. When a user uses a service provided by an application, the user receives user authentication by an authentication system through a client application such as a browser. This is because the service providing system determines whether the user has the authority to use the application. The authentication system performs user authentication by comparing the authentication information stored in advance with the authentication information included in the authentication request.

There are various data models for user management in the authentication system. However, as illustrated in FIG. 1, for example, in the case of user management by a company or the like in business, a tenant 111 is often set as a unit of company (organization) because security can be enhanced. In this case, the service providing system recognizes each company (organization) 102 as a tenant. Users such as employees (tenant administrator 112 and general user 113) are associated with the tenant 111. The unique range 101 of the email address includes all companies (organizations) 102.

The management method for each tenant has an advantage in terms of security, for example, it is possible to prevent unauthorized access by limiting the access range of the user belonging to each company to the company to which the user belongs.

The management becomes easy because the authority such as adding, deleting, and updating information of users in the tenant, registering the services (applications) that can be used by the users in the tenant, and assigning the authority to use the service (application) to the user can be concentrated to the tenant administrator 112.

However, from an opposite point of view, the general user 113 cannot use the application without involving the tenant administrator 112 even if there is an application that the general user 113 wants to use. From the user's point of view, following procedure is required to use a new application.

(i) Contact the tenant administrator 112, and the tenant administrator 112 registers the target application in the tenant.

(ii) The tenant administrator 112 purchases a license to use the application.

(iii) The tenant administrator 112 assigns use permission to the general user 113.

As describe above, complicated procedures are required, causing inconvenience.

Further, when the tenant administrator 112 registers the application in the tenant, the application will be open to a general user 113 belonging to the tenant who may not be interested in the application. General users 113 who are not interested do not have to use the application even if the application is made public, but there is a risk of confusion when selecting and executing an application. The application may be made to prevent such inconvenience, but cost increase is anticipated.

In addition, there are cases where a staff member (a member in the service provider) such as an application seller or a developer wants a general user 113 to use a trial application or the like for free. However, even the staff member needs the above procedures (i) to (iii) in order to have the general user 113 use the application. In addition, the staff member cannot manage the general user 113 (assigning license, user registering user, deleting user, etc.) using the application.

In the present embodiment, the convenience of general user and staff member regarding the use of the application is improved while maintaining the merit of user management for each tenant.

Figure 2:
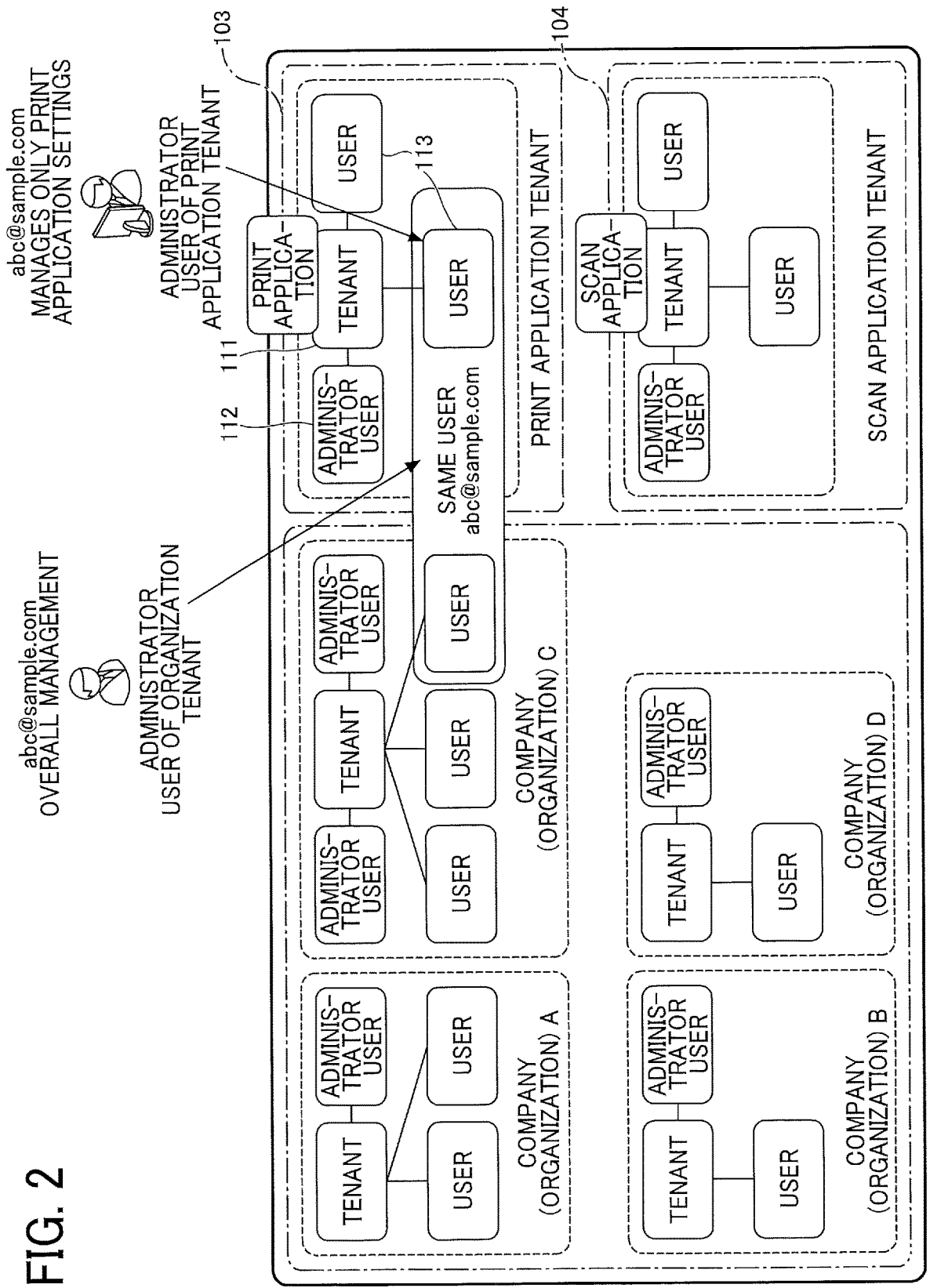
FIG. 2 is a block diagram illustrating an example of a configuration of the tenants according to embodiments of the present disclosure.

FIG. 2 is a block diagram illustrating an example of a configuration of the tenants. In the present embodiment, in addition to a conventional tenant 111 (hereinafter referred to as an organization tenant; an example of a first tenant), application tenants 103 and 104 (examples of second tenants) are prepared. In FIG. 2, the application tenant 103 prepared for a print application and the application tenant 104 prepared for a scanner application are illustrated. Like the organization tenant, the administrator, and general users (hereinafter, simply referred to as application tenant users) belong to the application tenants 103 and 104.

The application tenants 103 and 104 are created by the staff member. The users of the application tenants 103 and 104 are assumed to be providers of this application or persons who are interested in this application (mainly tenant administrators but can be general users). An application tenant user can register himself or herself in the application tenant. On the other hand, unlike organization tenants, the tenant administrator cannot additionally register the applications that can be used, and the applications that can be used by the users who belong to the application tenant are determined when the application tenant is created.

A unique range of email addresses (used for login) of users (administrators and general users) of application tenants 103 and 104 is limited to one application tenant. The email address is also unique within the organization tenant. Consequently, in the application tenant 103 and the application tenant 104 in FIG. 2, the application tenant user has different accounts. Therefore, a general user may be registered in a plurality of application tenants in addition to one organization tenant by himself or herself. Note that unique does not indicate that the same user's email address is different in the application tenants 103 and 104 but indicates that the email addresses do not overlap within the application tenant 103 or do not overlap within the application tenant 104.

On the other hand, since the application tenants 103 and 104 are associated with the organization tenant, the application tenant user cannot log in to the application tenants 103 and 104 unless the application tenant user logs in to the organization tenant. The application tenant users who have logged in to the application tenants 103 and 104 can refer to information in the organization tenant. Therefore, the above-mentioned merits of the organization tenant can be utilized.

According to such a configuration, since the general user or the staff member registers the application tenant user in the application tenants 103 and 104, the convenience when the general user wants to start using the application can be improved. The application tenant user logs in to the application tenant to use an application that the application tenant user wants to use, and not all applications are open to the general users. Since the staff member can create an application tenant, the same procedure as for a general user is not required.

The tenant is information indicating a customer who shares the same software among a plurality of customers, that is, a company or the like which is a group of customers. Each user in the tenant can use the application contracted by the tenant, and the tenant administrator of the tenant can assign the use permission for multiple software instances (applications and packages that combine multiple applications) that are installed in the system to the user.

The application is a program executed by the terminal device and the information processing apparatus in order for the user to receive the service. The program executed by the terminal device and the information processing apparatus in cooperation is also called a web application. The application may be, for example, a workflow application that executes a series of processes in order. The application can be built by tenant administrators, etc. by combining components. For example, an application that uploads and saves a document read by the electronic device 40 to a storage on the cloud may be built by combining a document reading component, a document transmitting component, and the like. The application may also be licensed as the package described above. In this case, the application package and the application are treated the same.

Figure 3:
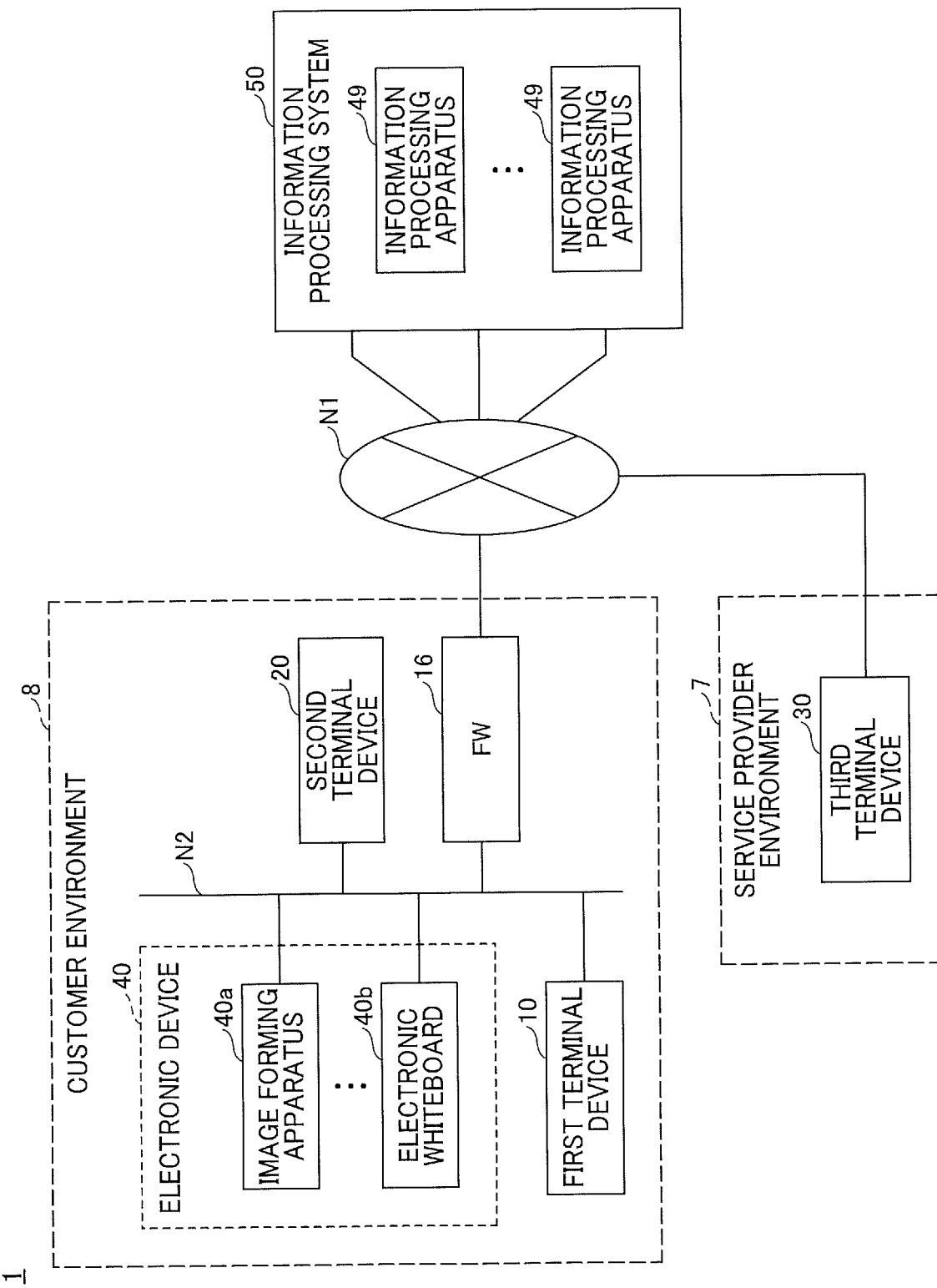
FIG. 3 is a block diagram illustrating a system configuration of an example of a service providing system.

FIG. 3 is a block diagram illustrating an example of a configuration of the service providing system 1 according to the present embodiment. In the service providing system 1 of FIG. 3, the customer environment 8 and the service provider environment 7 are connected to the information processing system 50 through a network N1 such as the internet. The network N1 also includes a telephone network such as a mobile phone network.

The customer is a customer of a service provided by the information processing system 50, and includes an organization such as a company, a body, an educational institution, an administrative organization, or a department. Those who have some kind of employment relationship with the customer are users. In the customer environment 8, one or more electronic devices 40, a first terminal device 10, a second terminal device 20, and a firewall (FW) 16 are connected through a network N2 such as a local area network (LAN). Further, the information processing system 50 includes one or more information processing apparatuses 49 connected to the network N1. The service provider is a provider of services to the customers. The third terminal device 30 is included in the service provider environment 7.

The electronic device 40 is, for example, an image forming apparatus 40a, and the image forming apparatus 40a includes a laser printer, a multifunction printer (MFP), and the like. Further, as the electronic device 40, an electronic whiteboard 40b may also be mentioned. In addition, the electronic device 40 includes, for example, an output device such as a projector (PJ), a digital signage, a head up display (HUD) device, an industrial machine, an imaging device, a sound collecting device, a medical device, a network home appliance, and an automobile (a connected car), a notebook PC, a mobile phone, a smartphone, a tablet terminal, a game machine, a personal digital assistant (PDA), a digital camera, a wearable PC, a desktop PC, or the like.

The electronic device 40 of the present embodiment is a terminal on which the user registered in the information processing system 50 uses the service. The user logs in to the information processing system 50 from the electronic device 40, selects an application (for example, a web application) for which the user is authorized to use, and receives the service provided by the information processing system 50. As described above, the service is provided on an application by application basis.

The first terminal device 10 is an information processing apparatus such as a smartphone, a mobile phone, a tablet PC, a desktop PC, or a notebook PC used by the tenant administrator. The first terminal device 10 is installed with a program including a screen display function such as a web browser. The program is not limited to the web browser as long as the program includes a function of displaying screen information received from the information processing apparatus as a screen. A program dedicated to the information processing system 50 may be used.

The second terminal device 20 is an information processing apparatus such as the smartphone, the mobile phone, the tablet PC, the desktop PC, or the notebook PC used by the general user. The second terminal device 20 is installed with the program including the screen display function such as the web browser. The program is not limited to the web browser as long as the program includes a function of displaying screen information received from the information processing apparatus as a screen. The program dedicated to the information processing system 50 may be used.

The third terminal device 30 is an information processing apparatus such as the smartphone, the mobile phone, the tablet PC, the desktop PC, or the notebook PC used by the staff member. The third terminal device 30 is installed with the program including the screen display function such as the web browser. The program is not limited to the web browser as long as the program includes a function of displaying screen information received from the information processing apparatus as a screen. The program dedicated to the information processing system 50 may be used.

The firewall 16 is a device for preventing intrusion from the outside into the customer environment 8, and all communications to the customer environment 8 are monitored by the firewall 16. However, the above description does not apply when the first terminal device 10, the second terminal device 20, or the third terminal device 30 communicates with the information processing system 50 through the telephone network such as the mobile phone network.

The information processing system 50 provides various services to the electronic device 40, the second terminal device 20, and the like through the use of the application. The services vary depending on type of the electronic device 40. In the case of the image forming apparatus 40a, the services include uploading and saving a scanned document to the storage on the cloud and downloading and printing image data stored in the storage on the cloud, but the services are not limited to the services described here. In the case of the electronic whiteboard 40b, for example, the services include recognizing voice in real time and creating minutes, converting handwritten data into text, and the like. In the case of the second terminal device 20, for example, the services include a real-time translation service for web pages.

In the information processing system 50, the tenant and the user are associated with each other. The services (applications) that can be used are determined according to the role of the user, and the user uses the application that the user can use from the electronic device or the second terminal device 20. In addition, tenants, tenant administrators, and users have the following relationships.

One customer has one tenant. In this case, the tenant administrator and the user belong to one tenant.

One customer has multiple tenants. In this case, the tenant administrators do not necessarily belong to the tenants, but manage the users belonging to each tenant.

The users belong to one or more tenants. In either case, the user registered in the information processing system 50 belongs to any of the tenants, so if the user is identified after registration, the tenant to which the user belongs is also identified.

In the case of one customer having one tenant, when the tenant administrator logs in to the tenant, the tenant is automatically determined. (The tenant does not have to be designated.) In the case of one customer having multiple tenants, the tenant administrator should designate the tenant at login (or each tenant has a different account).

The information processing system 50 creates screen information of a web page to be displayed on the first terminal device 10, the second terminal device 20, the third terminal device 30, or the electronic device 40, and transmits the screen information to the first terminal device 10, the second terminal device 20, the third terminal device 30, or the electronic device 40. For example, the user information registration screen, the login screen, and the like, which are described below, are displayed.

The screen information is created by Hypertext Markup Language (HTML), Extensible Markup Language (XML), Cascade Style Sheet (CSS), JAVASCRIPT (registered trademark), and the like. The web page may be provided by the web application. The web application refers to software or a mechanism that is executed on the web browser and operates by coordinating a program in a programming language (for example, JAVASCRIPT (registered trademark)) that operates on the web browser with a program on the web server. The web page can be dynamically changed by the web application.

The information processing system 50 may be compatible with cloud computing. Cloud computing refers to a usage pattern in which resources on a network are used without being aware of specific hardware resources. The information processing system 50 that supports cloud computing may be referred to as a cloud system. The cloud system may be on the internet or on-premises.

The configuration of the service providing system 1 illustrated in FIG. 3 is an example, and one or more servers (proxy server, gateway server, etc.) may be interposed between the customer environment and the information processing apparatus. The first terminal device 10 and the second terminal device 20 may be in an environment other than the customer environment, and may be connected to, for example, the network N1. The third terminal device 30 may be in an environment other than the service provider environment, and may be connected to, for example, the network N1.

The information processing system 50 may be implemented by one information processing apparatus 49 or may be distributed and implemented by a plurality of information processing apparatuses 49. For example, each service may be provided by one information processing apparatus 49, one information processing apparatus 49 may provide a plurality of services, or a plurality of information processing apparatuses 49 may provide one service.

In the service providing system 1 of FIG. 3, the information processing apparatus is connected to the network N1 such as the internet outside the customer environment. In other words, the service providing system 1 of FIG. 3 is an example in which the information processing system 50 is provided in a cloud environment. However, the information processing system 50 may be provided inside the customer environment (on-premises environment).

Figure 4:
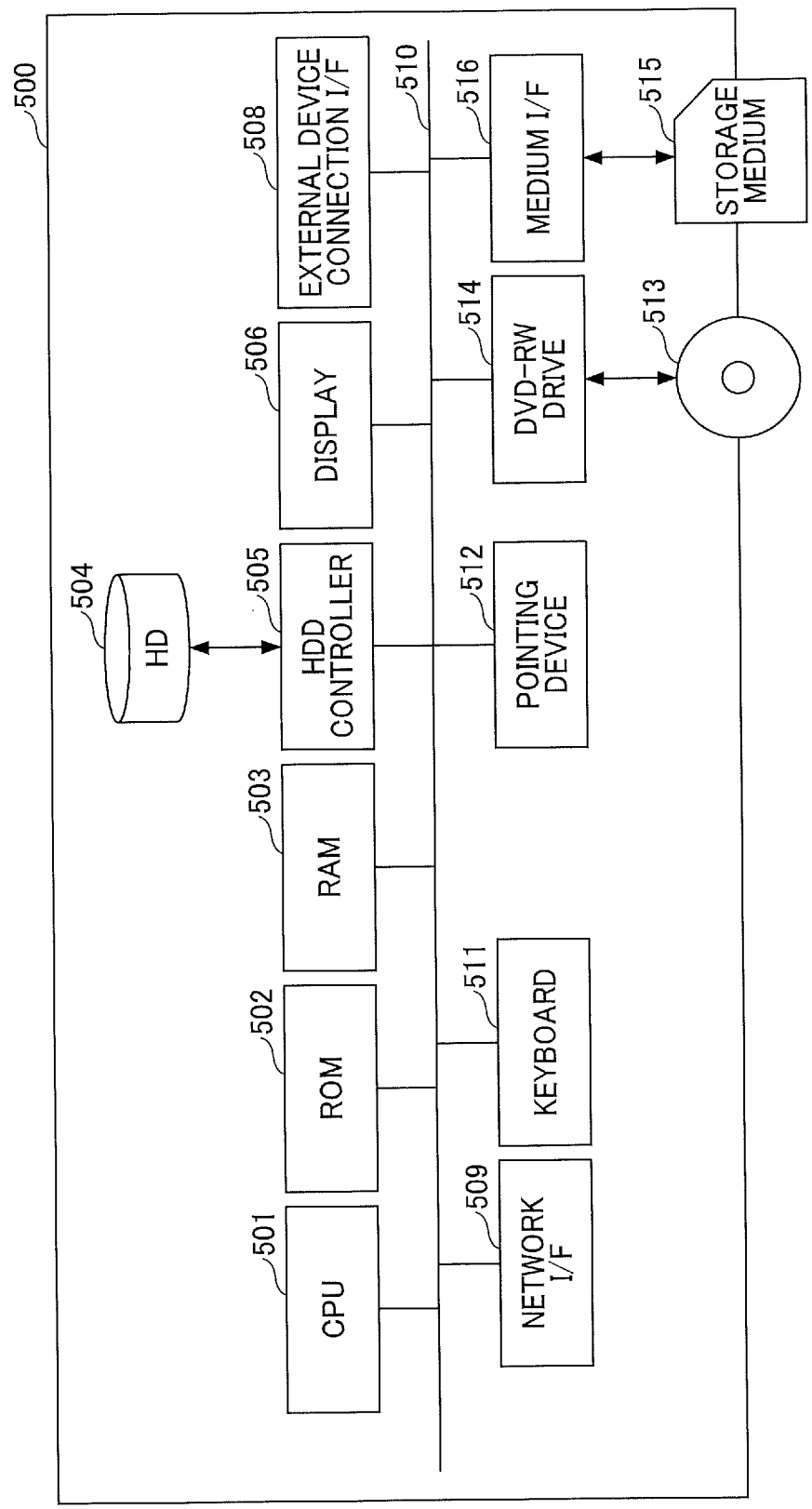
FIG. 4 is a block diagram illustrating a hardware configuration of an example of a computer.

The first terminal device 10, the second terminal device 20, the third terminal device 30, or the information processing system 50 of FIG. 3 is implemented by, for example, a computer having a hardware configuration illustrated in FIG. 4. FIG. 4 is a block diagram illustrating an example of a hardware configuration of the computer. The computer 500 of FIG. 4 is implemented by the computer as illustrated in FIG. 4 including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514 and a medium I/F 516.

Among these elements, the CPU 501 controls entire operation of the computer. The ROM 502 stores a program such as an initial program loader (IPL) used for driving the CPU 501. The RAM 503 is used as a work area for the CPU 501. The HD 504 stores various data such as programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a universal serial bus (USB) memory or a printer. The network I/F 509 is an interface for performing data communication using a communication network. The bus line 510 is an address bus, a data bus, or the like for electrically connecting each component such as the CPU 501 illustrated in FIG. 4.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading or writing (storage) of data to a storage medium 515 such as a flash memory.

Figure 5:
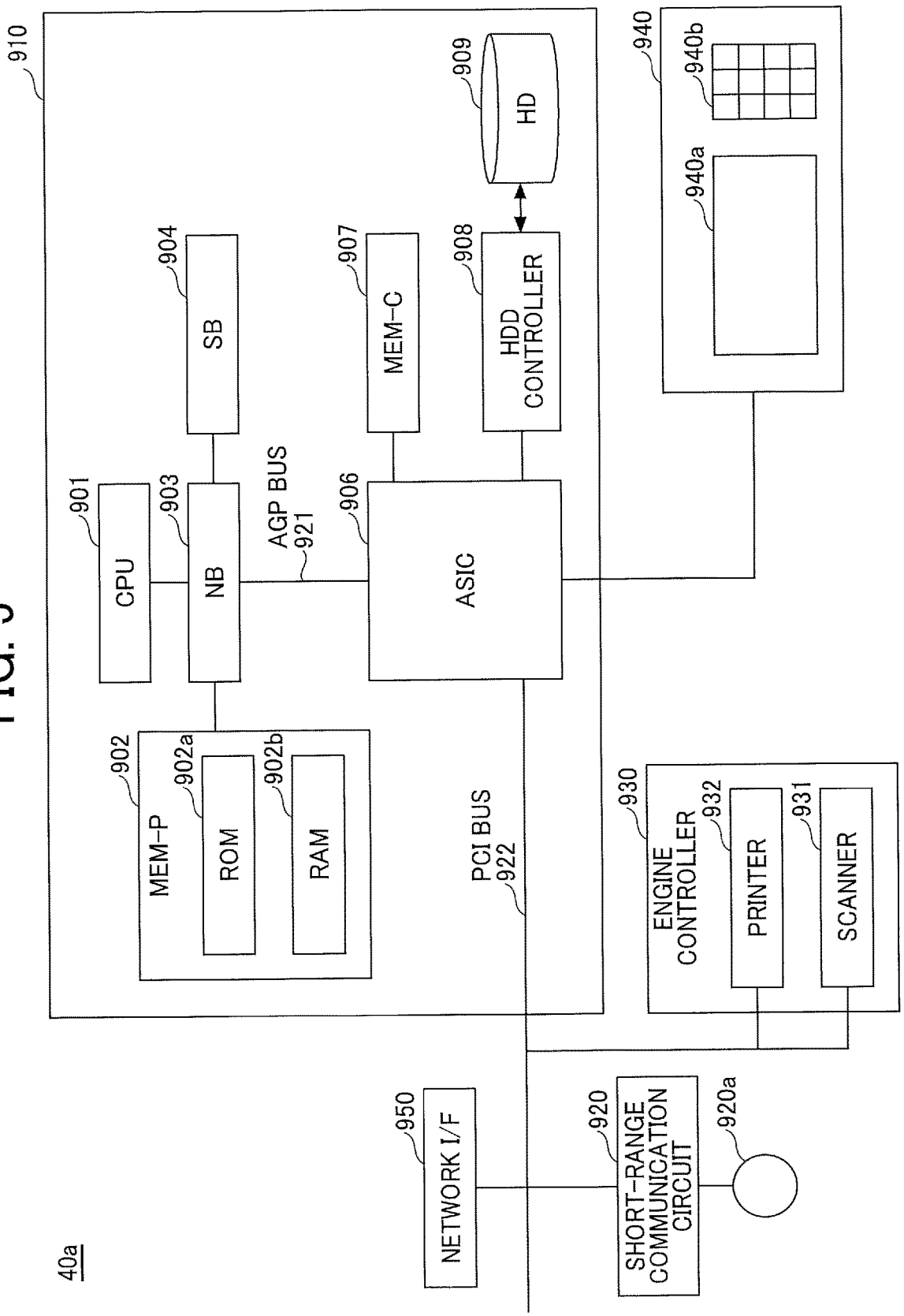
FIG. 5 is a block diagram illustrating a hardware configuration of an example of an image forming apparatus.

FIG. 5 is a block diagram illustrating a hardware configuration of an example of the image forming apparatus 40a. As illustrated in FIG. 5, the image forming apparatus 40a includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the image forming apparatus 40a. The NB 903 connects the CPU 901 with the MEM-P 902, SB 904, and AGP bus 921 and includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910 and further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 is a storage for storing image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with Near Field Communication (NFC), BLUETOOTH (registered trademark) and the like.

The engine controller 930 includes a scanner 931 and a printer 932. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls entire operation of the image forming apparatus 40a. For example, the controller 910 controls rendering, communication, or user inputs to the control panel 940. The scanner 931 or the printer 932 includes an image processing unit such as error diffusion processing and gamma conversion processing.

In response to an instruction to select a specific application through the control panel 940, for example, using a mode switch key, the image forming apparatus 40a selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile function is selected.

The network I/F 950 controls communication of data with an external device through the communication network. The short-range communication circuit 920 and the network I/F 950 are electrically connected to the ASIC 906 through the PCI bus 922.

Figure 6:
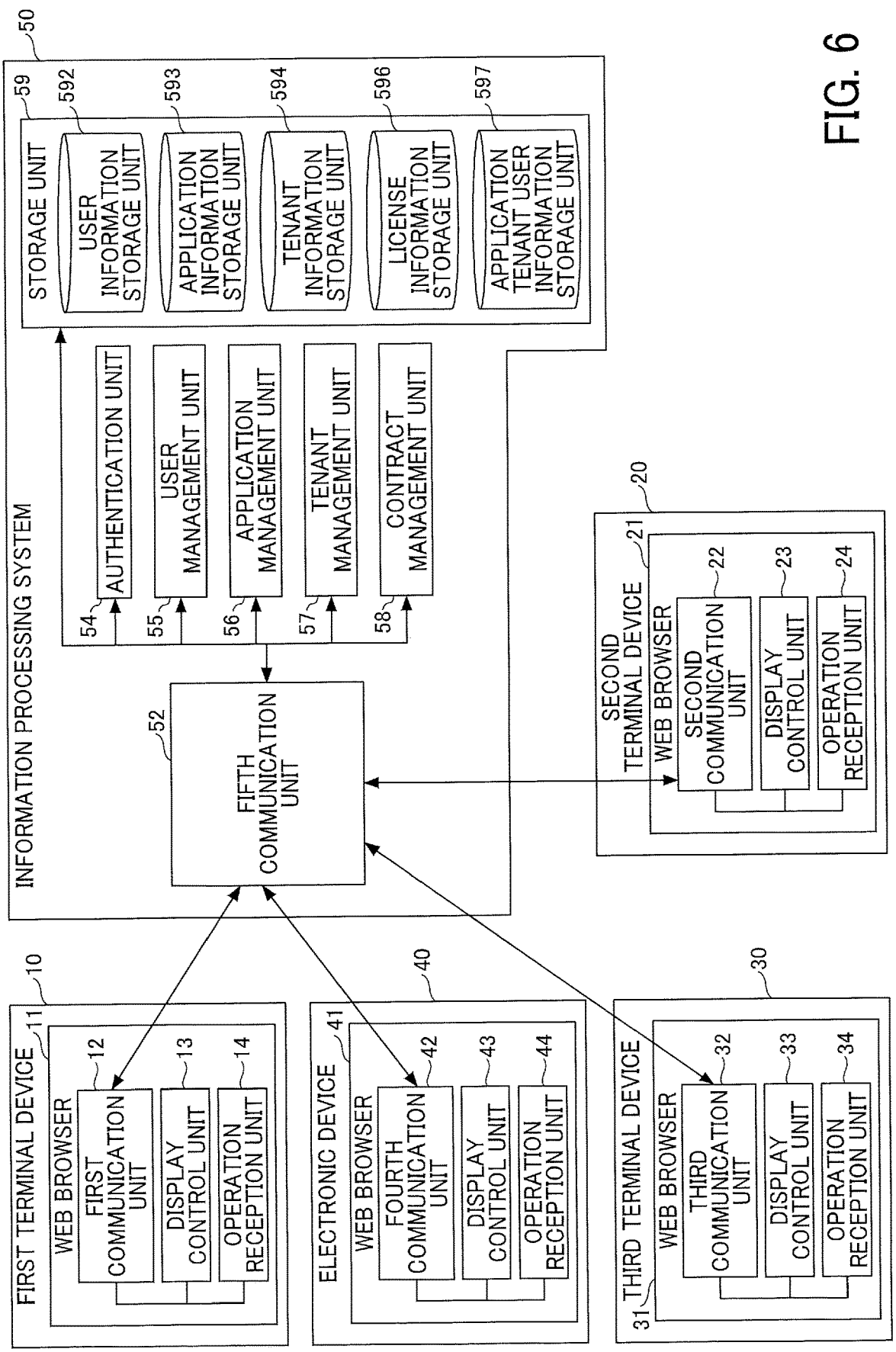
FIG. 6 is a block diagram illustrating functions of a first terminal device, a second terminal device, a third terminal device, an electronic device, and an information processing system.

The function of each device of the service providing system 1 according to the present embodiment is implemented by, for example, a functional block illustrated in FIG. 6. FIG. 6 is a block diagram illustrating the functions of the first terminal device 10, the second terminal device 20, the third terminal device 30, the electronic device 40, and the information processing system 50.

The first terminal device 10 includes a first communication unit 12, a display control unit 13, and an operation reception unit 14. The first terminal device 10 implements functions illustrated in FIG. 6 by executing a program (for example, a web browser 11).

The first communication unit 12 communicates with the information processing system 50 and receives screen information for the first terminal device 10 to display a user information registration screen or the like. In addition, the information input by the tenant administrator on the user information registration screen is transmitted to the information processing system 50.

The display control unit 13 analyzes the screen information of the screen received from the information processing system 50 and displays, for example, a user information registration screen or the like on the display 506. The operation reception unit 14 receives operation (input to each screen) of the tenant administrator for the first terminal device 10.

The second terminal device 20 includes a second communication unit 22, a display control unit 23, and an operation reception unit 24. The second terminal device 20 implements functions illustrated in FIG. 6 by executing a program (for example, a web browser 21).

The second communication unit 22 communicates with the information processing system 50 and receives screen information for the second terminal device 20 to display a login screen, an application tenant user registration screen, and the like. In addition, information input by the user on the login screen and the application tenant user registration screen is transmitted to the information processing system 50.

The display control unit 23 analyzes the screen information of the screen received from the information processing system 50 and displays, for example, the login screen or the application tenant user registration screen on the display 506. The operation reception unit 24 receives the user's operation on the second terminal device 20.

The third terminal device 30 includes a third communication unit 32, a display control unit 33, and an operation reception unit 34. The third terminal device 30 implements functions illustrated in FIG. 6 by executing a program (for example, a web browser 31).

The third communication unit 32 communicates with the information processing system 50 and receives screen information for the third terminal device 30 to display the application tenant user registration screen and the like. In addition, the information input by the staff member on the application tenant user registration screen is transmitted to the information processing system 50.

The display control unit 33 analyzes the screen information of the screen received from the information processing system 50 and displays, for example, an application tenant user registration screen on the display 506. The operation reception unit 24 receives the operation of the staff member for the third terminal device 30.

The electronic device 40 includes a fourth communication unit 42, a display control unit 43, and an operation reception unit 44. The electronic device 40 implements functions illustrated in FIG. 6 by executing a program (for example, a web browser 41).

The fourth communication unit 42 communicates with the information processing system 50 to receive screen information for the electronic device 40 to display a standby screen, a launcher screen, a login screen, an application list screen, and the like. In addition, information input by the user on the standby screen, the launcher screen, the login screen, and the application list screen are transmitted to the information processing system 50.

The display control unit 43 analyzes the screen information of the screen received from the information processing system 50 and displays, for example, the standby screen, the launcher screen, the login screen, and the application list screen on the control panel 940. The operation reception unit 44 receives user operation on the electronic device 40 (for example, launching a launcher, inputting authentication information, selecting an application, operating an application, etc.).

The information processing system 50 includes a fifth communication unit 52, an authentication unit 54, a user management unit 55, an application management unit 56, a tenant management unit 57, and a contract management unit 58. These functions of the information processing system 50 are functions implemented by the CPU 501 of the computer 500 illustrated in FIG. 4 executing a program developed from the HD 504 to the RAM 503.

Further, in FIG. 6, the information processing system 50 includes each function for the convenience of drawing, but each function may be distributed and arranged in a plurality of information processing apparatuses.

The fifth communication unit 52 transmits and receives various information to and from the first terminal device 10, the second terminal device 20, the third terminal device 30, and the electronic device 40. For example, the screen information of the user information registration screen is transmitted to the first terminal device 10, the screen information of the login screen and the application tenant user registration screen is transmitted to the second terminal device 20, the screen information such as the application tenant user registration screen is transmitted to the third terminal device 30, and the screen information of the standby screen, the launcher screen, the application list screen, the login screen, and the application screen is transmitted to the electronic device 40. In addition, the information entered on these screens are received.

The authentication unit 54 authenticates the staff member, the tenant administrator, and the general users (including the application tenant user) and determines whether authentication succeeds or fails. Authentication refers to determining whether or not the person who requested the authentication is a legitimate authority. In the present embodiment, the authentication unit 54 determines whether to permit the use of the information processing system 50, and further, determines whether the person who requested the authentication is the staff member, the general user, or the tenant administrator. Successful authentication indicates that the information processing system 50 permits the staff member, the general user, or the tenant administrator to log in. A login is an authentication act to access system resources with pre-registered authentication information when using various services on the computer or the internet. The authentication information is a user identifier (ID) and a password, an integrated circuit (IC) card number, biometric authentication information, or the like.

The user management unit 55 manages user information, stores the user information in the user information storage unit 592, which is described below, and acquires (reads) the user information from the user information storage unit 592.

The application management unit 56 manages each application, manages the default settings of the application for each user, and reflects the default settings in the application.

The tenant management unit 57 manages tenant information related to the tenant and stores and acquires the tenant information in the tenant information storage unit 594.

The contract management unit 58 receives the contract of the application and registers the license information in the license information storage unit 596. The contract management unit 58 also manages the number of licenses and an expiration date.

Further, the information processing system 50 includes a storage unit 59 implemented by the HD 504, the RAM 503, and the like illustrated in FIG. 4. The storage unit 59 includes a user information storage unit 592, an application information storage unit 593, a tenant information storage unit 594, a license information storage unit 596, and an application tenant user information storage unit 597.

TABLE 1

| Item | Description |
|---|---|
| Tenant ID | Identification information of tenant to which user belongs |
| User ID | U0123 |
| Password | xxxxxxxx |

TABLE 1-continued

| Item | Description |
|---|---|
| Last name | tokkyo |
| Name | taro |
| Email address | taro@sample.com |
| Display language (locale) | Japanese |
| Account status | Valid, invalid, or locked |
| Role | Administrator or general user |
| Application use permission initial settings | List of applications |
| Application Tenant Authority | User registration: Yes License purchase: No |
| Application settings | Application A: Scanning resolution, Density, Color |

Table 1 schematically illustrates the user information stored in the user information storage unit 592. The user information is associated with the tenant ID. There are as many user information as there are users belonging to the tenant. Note that the users of the user information storage unit 592 include the tenant administrator. User information is registered by the tenant administrator by connecting to the information processing system 50.

User information includes the tenant ID, user ID, password, last name, name, email address, display language (locale), account status, role, application use permission, application tenant authority, and application settings. The tenant ID is the identification information of the tenant to which the user belongs. The user ID is the user identification information. The password is confidential information of a user required for authentication.

The last name is the surname of the user. The name is the name of the user. The email address is the user's email address. The display language (locale) is the language of characters displayed on the screen used by the user. The account status is status of an account which is a right for a user to log in to the information processing system 50. There are at least three states in the account status which are valid, invalid or account locked. If user information is temporarily registered, the user information is invalid, and the user information is validated by full registration. The tenant administrator can invalidate an account even after the account has been validated. An account lock is set when the user makes mistakes in entering the password several times. The account lock differs from an invalid account in that, for example, a locked account returns to validity after a period of time or remain counted as users belonging to the tenant. The role is a user authority. For example, the role may be the tenant administrator or the general user. In the present embodiment, the tenant administrator and the general user are referred to as users. The application use permission indicates applications that can be used by the user. A list of applications to which the user has the use permission is stored. The application tenant authority is user authority related to application tenant settings. For example, whether the user can register himself or herself in the application tenant and whether the license can be purchased for using the application are set. The application settings indicate user default settings registered for each application. The users can execute the application with suitable settings without having to reconfigure.

TABLE 2

| Item | Description |
|---|---|
| Tenant ID | ID of tenant that uses application |
| Application ID | ID of application |
| Role | Tenant administrator or general user |

Table 2 schematically illustrates the application information stored in the application information storage unit 593. The application information includes the application ID and the role corresponding to the tenant ID. The staff member registers the application information according to the contract status of the service. The application information may be automatically registered according to the contract of service. Each application may or may not belong to an application package (multiple applications that are often used together). The tenant ID is the identification information of the tenant to whom the application was sold. The application ID is the identification information of the application. The role is the authority to use the application. For example, the role may be the tenant administrator or the general user.

TABLE 3

| Item | Description |
| --- | --- |
| Tenant ID | Identification information of tenant |
| Tenant name | Name of tenant |
| Registration date | Registration date of tenant |

Table 3 schematically illustrates the tenant information stored in the tenant information storage unit 594. The tenant information includes a tenant name and a registration date corresponding to a tenant ID. The tenant ID is the identification information of the tenant. The tenant name is a name of the tenant, which is a company name, a department name, or the like. The registration date is the date that the tenant is registered.

TABLE 4

| Item | Description |
| --- | --- |
| License name | Name of purchased license |
| License type | User license or device license |
| Number of licenses | 100 |

Table 4 schematically illustrates license information stored in the license information storage unit 596. The license information includes a license name, a license type, and a number of licenses. The license name is the name of the purchased license. The license name may have a function of identifying a license. The license is associated with the application by the license name. The license type indicates whether the contract is for each user or for each electronic device. The license type may also indicate if the license is under a trial contract or under an official contract. The number of licenses indicates the number of users, the number of electronic devices 40 or both that can use the application.

TABLE 5

| Item | Description |
| --- | --- |
| User ID | Identification information of user registered in application tenant |
| Application ID | Identification information of application registered in application tenant |
| Application Name | Name of application registered in application tenant |

Table 5 schematically illustrates application tenant user information stored in the application tenant user information storage unit 597. The user ID is the identification information of a user belonging to the application tenant. The application ID is the identification information of an application belonging to the application tenant. Multiple applications may be registered in one application tenant. The application name is a name of the application that belongs to the application tenant.

Figure 7:
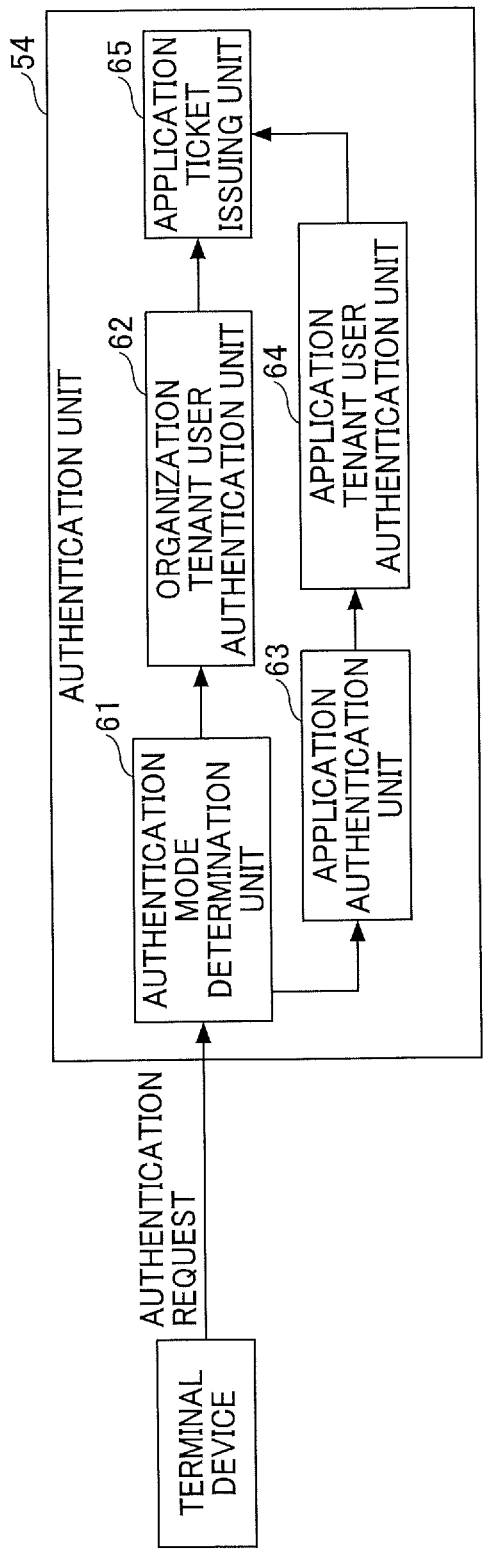
FIG. 7 is a block diagram illustrating an example of a functional configuration of an authentication unit.

A function of the authentication unit 54 is described with reference to FIG. 7. FIG. 7 is a block diagram illustrating an example of a functional configuration of the authentication unit 54. The authentication unit 54 includes an authentication mode determination unit 61, an organization tenant user authentication unit 62, an application authentication unit 63, an application tenant user authentication unit 64, and an authentication ticket issuing unit 65.

The authentication mode determination unit 61 determines whether the authentication request from the first terminal device 10, the second terminal device 20, or the third terminal device 30 is an authentication request to the organization tenant or an authentication request to the application tenant. For example, when an application ID (application_id) is included in the authentication request as illustrated below, the authentication request is determined that the authentication is for the application tenant user. {application_id: "cloud_print_webapplication", user_id: "User0001", password: "password" } When the application ID is not included as illustrated below, the authentication request is determined that the authentication is for the organization tenant user. {user_id: "User0001", password: "password" } When the user to be authenticated is an organization tenant user, the organization tenant user authentication unit 62 authenticates the organization tenant user based on the authentication information of the user information storage unit 592.

When the user to be authenticated is an application tenant user, the application authentication unit 63 refers to the application tenant user information storage unit 597 and based on the application ID included in the authentication request, identifies the application tenant requesting the authentication.

The application tenant user authentication unit 64 searches the user information storage unit 592 with the user ID registered in the login target application tenant and acquires the authentication information of the user. Then, the application tenant user authentication unit 64 compares the authentication information of the user with the password or the like transmitted from the terminal device and determines whether the authentication of the application tenant user is successful or unsuccessful.

The authentication ticket issuing unit 65 issues an authentication ticket when the authentication is successful. In response to an authentication of an organization tenant user, an authentication ticket that allows an access to the resources of the organization tenant is issued. In response to a successful authentication of an application tenant user, an authentication ticket that has only the authority to use the application is issued. For example, the setting of the user information storage unit 592 and the like can be changed by the authentication ticket of the organization tenant, but only the reference of the information is permitted by the authentication ticket of the application tenant. In addition, with the authentication ticket of the organization tenant, the user can use all the applications for which the logged-in user has the use permission, but with the authentication ticket of the application tenant, only the applications belonging to the logged-in application tenant can be used. As described above, different authentication tickets are issued depending on whether the user is the organization tenant or the application tenant user.

Figure 8:
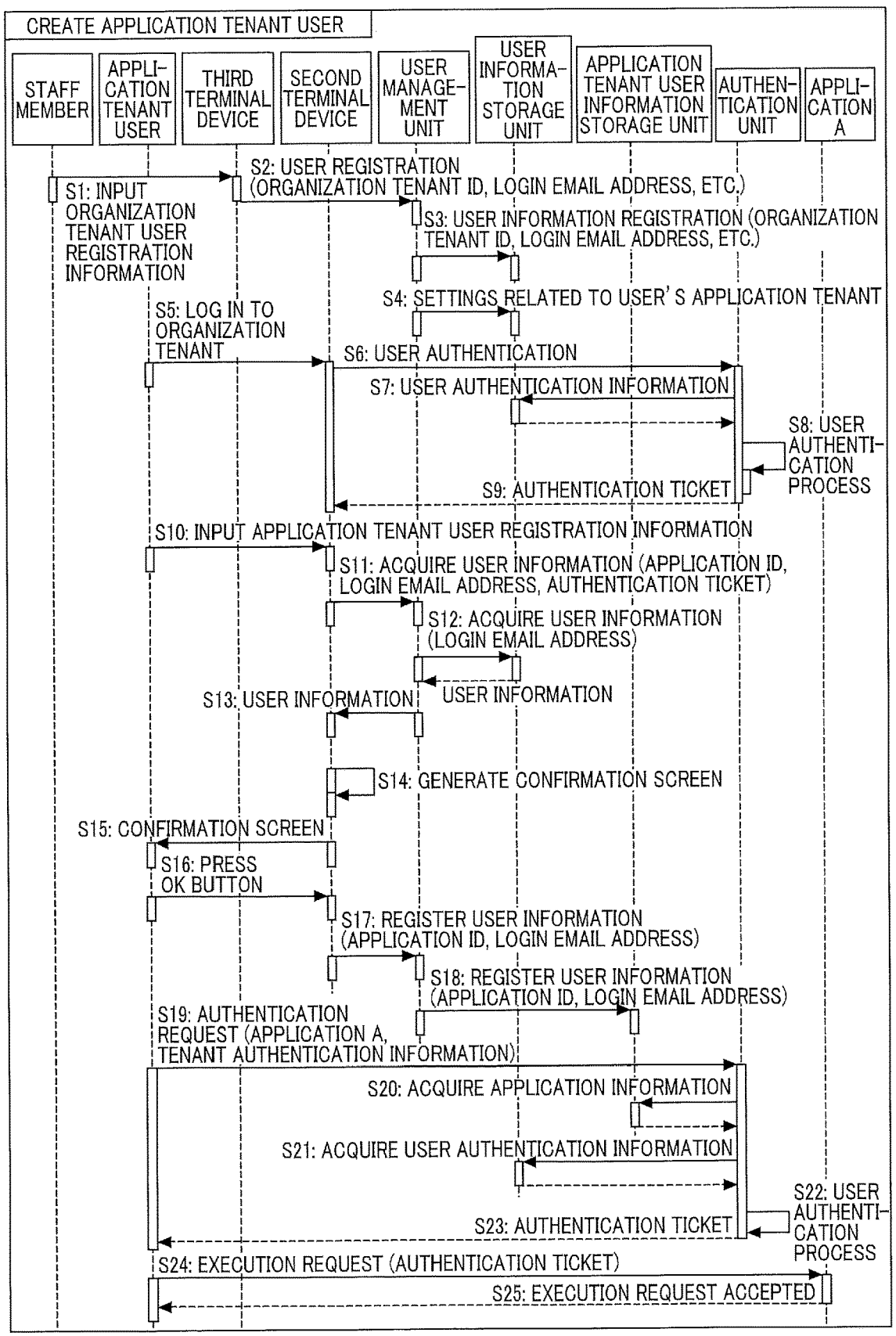
FIG. 8 is a sequence diagram illustrating an example of a registration process of an application tenant user and execution of an application.

FIG. 8 is a sequence diagram illustrating an example of a registration process of an application tenant user and execution of an application.

In step S1, the display control unit 33 of the third terminal device 30 displays the registration screen of the organization tenant user in response to an operation of the staff member. The staff member inputs information related to the organization tenant user into the third terminal device 30. The operation reception unit 34 of the third terminal device 30 receives the input.

In step S2, the third communication unit 32 of the third terminal device 30 designates the tenant ID of the registration destination and transmits the user registration request to the information processing system 50.

In step S3, the fifth communication unit 52 of the information processing system 50 receives the user registration request, and the user management unit 55 registers the user information in the user information storage unit 592.

In step S4, the user management unit 55 configures the settings related to the user's application tenant. For example, the user management unit 55 sets whether the registered user can freely register himself or herself in the application tenant or sets whether the license can be freely purchased to use the application.

In step S5, the general user registers himself or herself in the application tenant. The general user registered in the organization tenant logs in to the organization tenant using the second terminal device 20. The general user inputs the email address and password, or the tenant ID, user ID and password to log in. The operation reception unit 24 of the second terminal device 20 receives the input. Examples of the login screens are illustrated in FIGS. 9A and 9B.

In step S6, the second communication unit 22 of the second terminal device 20 designates the authentication information and transmits the authentication request of the organization tenant user to the information processing system 50.

In step S7, the fifth communication unit 52 of the information processing system 50 receives the authentication request. First, the authentication mode determination unit 61 determines the authentication mode according to whether the application ID is included in the authentication request. Since the login screen of FIGS. 9A and 9B does not include the application ID, it is assumed that the user authentication is performed to the organization tenant. Therefore, the organization tenant user authentication unit 62 acquires the email address and password, or the tenant ID, user ID, and password from the user information storage unit 592.

In step S8, the organization tenant user authentication unit 62 compares the acquired authentication information with the authentication information input by the general user and determines that the authentication is successful when the acquired authentication information and the authentication information input by the general user match. If the acquired authentication information and the authentication information input by the general user do not match, the organization tenant user authentication unit 62 determines that the authentication has failed.

In step S9 in response to a successful authentication, the user is identified, and the fifth communication unit 52 transmits the authentication ticket to the second terminal device 20. The authentication ticket indicates that the user (tenant ID, user ID) is a user of the organization tenant, whether or not the user can register himself or herself in the application tenant, the role of the user, and the applications that can be used. The authentication ticket is stored in a storage area that can be referenced by the web browser.

On the other hand, the information related to the application tenant created by the staff member is sent to all users in the organization tenant or to selected users by email or chat application. The general user in the organization tenant register himself or herself in the application tenant when there is an application that the general user wants to use.

In step S10, the general user performs an operation of registering the application tenant user by designating the application ID using the second terminal device 20 to register himself or herself in the application tenant. The application ID is sent from the staff member together with a notice indicating that the application tenant has been created. For example, the registration universal resource locator (URL) of the application tenant and the application ID are linked to the notice indicating that the application tenant has been created. When the general user presses the registration URL, the operation reception unit 24 of the second terminal device 20 accepts the operation. The user information of the organization tenant user (user information stored in the user information storage unit 592) is used for the registration of the application tenant user.

In step S11, the second communication unit 22 requests the information processing system 50 to acquire user information by designating the application ID, the email address (entered by a general user or included in the authentication ticket), and the authentication ticket.

In step S12, the fifth communication unit 52 of the information processing system 50 receives the user information acquisition request and the user management unit 55 acquires the user information associated with the email address from the user information storage unit 592.

In step S13, the fifth communication unit 52 transmits the user information to the second terminal device 20.

In steps S14 and S15, the second communication unit 22 of the second terminal device 20 receives the user information and the display control unit 23 generates and displays a confirmation screen. For example, a message "The following user with the same email address is registered. Do you want to register as this user?" is displayed. In addition, the user ID, first and last name, locale, time zone, status, role, and the like may be displayed. The general user can refer to this information and decide whether to register as an application tenant user.

Note that the general user may not explicitly register the user in the application tenant, but when the general user directly accesses the application A, the user may be transferred to the registration screen.

Further, the tenant administrator may register the general user in the application tenant. One of the features of the present embodiment is that a general user can freely register himself or herself in the application tenant. However, the general user is preferably a user belonging to the organization tenant. This is because the application tenant can also obtain merits such as ease of management of the organization tenant.

However, a user may be registered in the application tenant even if the user does not have an account in the organization tenant.

In step S16, the general user presses an OK button to register himself or herself in the application tenant. The operation reception unit 24 of the second terminal device 20 accepts the pressing of the OK button.

In step S17, the second communication unit 22 of the second terminal device 20 requests the information processing system 50 to register the user by designating the application ID and the email address.

In step S18, the fifth communication unit 52 of the information processing system 50 receives the user registration request, and the user management unit 55 registers the application ID and the email address in the application tenant user information storage unit 597. The email address corresponds to the user ID. The user management unit 55 registers the application ID and the email address in the application tenant user information storage unit 597 when the user registration of the application tenant authority of the user information storage unit 592 is "Yes".

As described above, the application tenant user registered in the application tenant can execute the application belonging to the tenant application.

Figure 10:
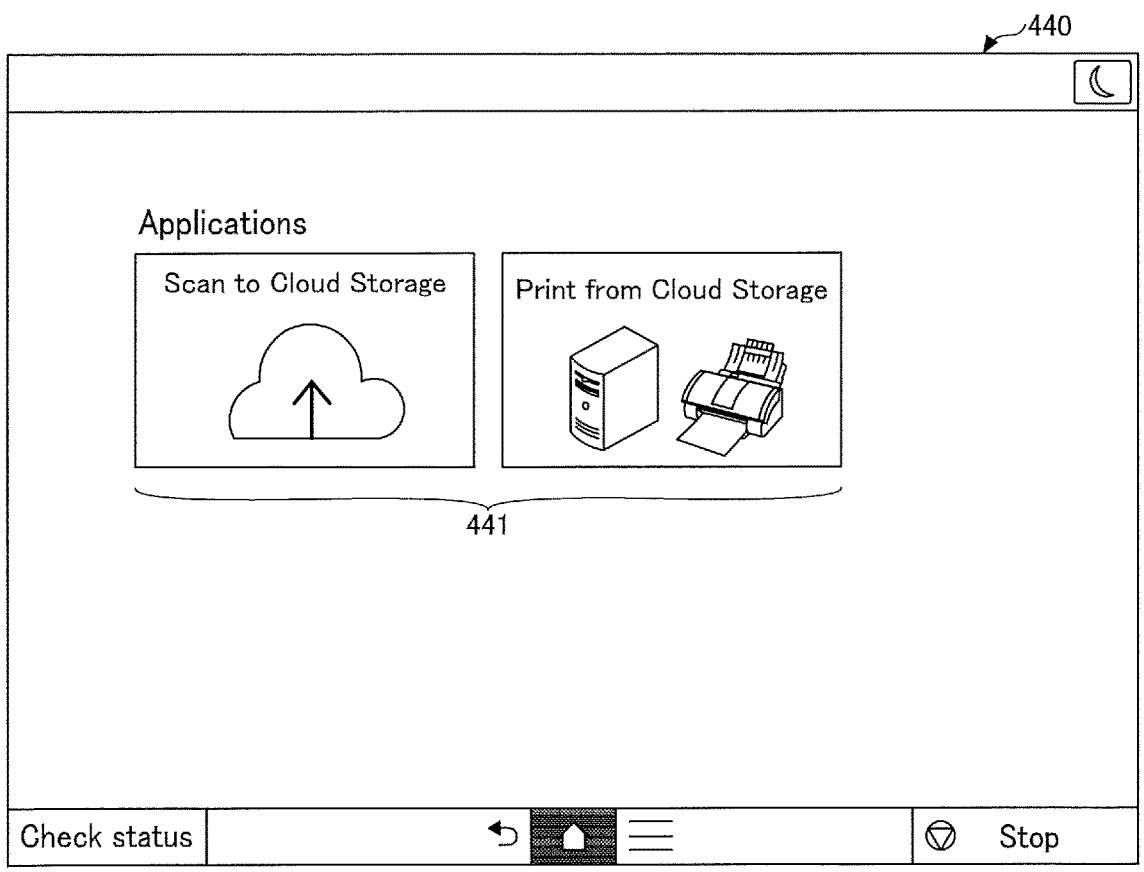
FIG. 10 is a diagram illustrating an example of an application list screen displayed by the electronic device.
Figure 11:
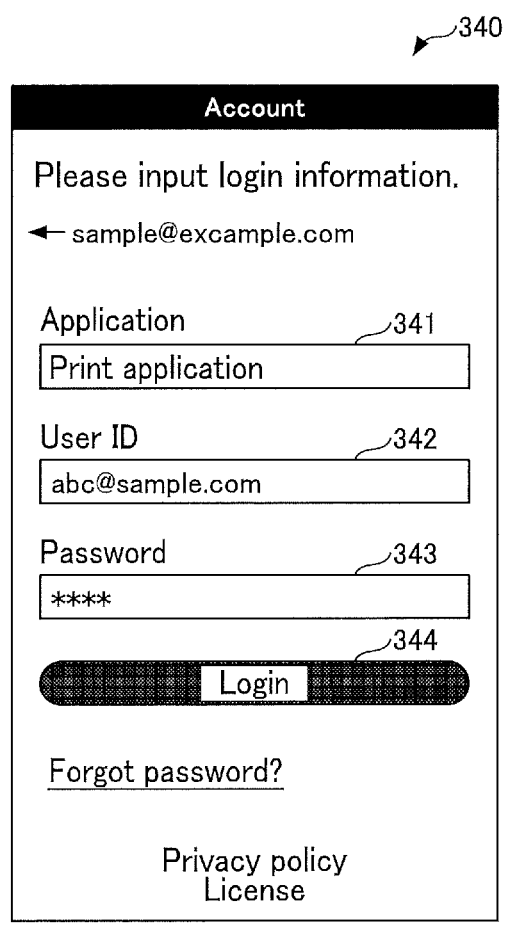
FIG. 11 is a diagram illustrating an example of a login screen of an application tenant user displayed by the electronic device.

In step S19, the application tenant user registered in the application tenant operates the electronic device 40 to display the application list screen belonging to the application tenant. The application tenant user selects the desired application to use and enters the application tenant authentication information on the login screen. For example, the application tenant user enters the application ID, user ID and password (user ID and password of the organization tenant may be used). The application ID is associated with the application selected from the application list screen. The operation reception unit 44 receives the input, and the fourth communication unit 42 transmits the authentication request to the information processing system 50. The fifth communication unit 52 of the information processing system 50 receives the authentication request. An example of the application list screen is illustrated in FIG. 10, and an example of the login screen is illustrated in FIG. 11.

In step S20, the authentication mode determination unit 61 determines that the authentication request is an authentication request to the application tenant, since the authentication request includes the application ID. Further, the application authentication unit 63 refers to the application tenant user information storage unit 597 with the application ID to identify the application. This application is associated with the authentication ticket in step S23.

In step S21, the application tenant user authentication unit 64 searches the user information storage unit 592 with the user ID and acquires the user ID and password.

In step S22, the application tenant user authentication unit 64 compares the acquired password and user ID with the user ID and password entered by the application tenant user and when the user IDs and passwords match, determines that the authentication is successful. When the acquired authentication information and the authentication information input by the general user do not match, the organization tenant user authentication unit 62 determines that the authentication has failed. As described above, whether the user can execute the application is determined based on the authentication information in the organization tenant identified by the user identification information.

In step S23, in response to a successful authentication, the user is identified, and the fifth communication unit 52 transmits the authentication ticket to the second terminal device 20. The authentication ticket indicates that the user has the authority to use the application A belonging to the tenant application in which the user has logged in. At the time of issuing the authentication ticket, it is preferable to confirm that the organization tenant holds the license of the corresponding application.

When the user logs in to the organization tenant, the user can use the application for which the tenant administrator has assigned the use permission to the user (application use permission of the user information storage unit 592).

In step S24, the application tenant user operates the electronic device 40 to execute the application A. The operation reception unit 44 receives the operation. The fourth communication unit 42 designates the authentication ticket and requests the information processing system 50 to execute the application A.

In step S25, the fifth communication unit 52 of the information processing system 50 receives the execution request of the application A and the application management unit 56 permits the execution of the application A because the authentication ticket permits the execution of the application A. The application management unit 56 acquires the application settings of the user identified by the user ID from the user information storage unit 592 and the application management unit 56 transmits the application screen of the application A for which the application settings is applied to the second terminal device 20. With the above, the application tenant user can use the application A.

As described above, since the general user can register himself or herself in the application tenant that the general user wants to use, the convenience when the user wants to start using the application can be improved. Since the application tenant user can execute the application, users who are not interested in the application do not need to be aware of the existence of the application, such as when the tenant administrator registers the application in the tenant. Since the staff member can register the application tenant, the procedure equivalent to that of a general user is not required.

FIGS. 9A and 9B are diagrams illustrating examples of login screens displayed by the first terminal device 10 or the second terminal device 20. The authentication information to be input is different between FIG. 9A and FIG. 9B.

The login screen 330 of FIG. 9A includes a tenant ID field 331, a user ID field 332, a password field 333, and a login button 334. The tenant administrator or general user inputs the tenant ID in the tenant ID field 331, the user ID in the user ID field 332, and the password in the password field 333. These are examples of the authentication information. In response to the user pressing the login button 334, the authentication request is transmitted to the information processing system 50.

The login screen 330 of FIG. 9B includes an email address field 336, the password field 333, and the login button 334. The tenant administrator or general user inputs the email address in the email address field 336, and the password in the password field 333. These are examples of the authentication information. The reason why the tenant ID is unnecessary in FIG. 9B is that the email address is unique regardless of the tenant. In response to the user pressing the login button 334, the authentication request is transmitted to the information processing system 50.

FIG. 10 is a diagram illustrating an example of an application list screen 440 displayed by the electronic device 40. On the application list screen 440, a list of applications belonging to each application tenant is collectively displayed. The list is also a list of application tenants. The application list screen 440 is displayed by a particular operation, for example, by a general user, or a tenant administrator looking for an application which the general user or the tenant administrators want to use, or a tenant administrator recommended by a staff member (application tenant user who registered himself or herself in the application tenant, or application tenant user registered in the application tenant by the staff member). When the user selects the application which the user wants to use, the login screen of the application tenant is displayed.

FIG. 11 is a diagram illustrating an example of a login screen 340 for an application tenant user displayed by the electronic device 40. The login screen 340 of FIG. 11 includes an application name field 341, a user ID field 342, a password field 343, and a login button 344.

When the application tenant user logs in to the application tenant, the authentication information desirably includes the application name or the application ID. In response to the user selecting an application on the application list screen 440, the login screen 340 is displayed with the application name of the selected application displayed in the application name field 341. When the user inputs the email address of the organization tenant in the user ID field 342 and the password of the organization tenant in the password field 343, the user can log in to the application tenant and execute the application.

When the user knows the application name, the application may be executed from the login screen 340 without going through the application list screen 440.

In response to an authentication failure, the authentication unit 54 may display a screen for registering a user in the application tenant on the electronic device 40.

As described above, in the service providing system of the present embodiment, since the general user or the staff member registers the application tenant user in the application tenant, the convenience when the general user wants to start using the application can be improved. The application tenant user logs in to the application tenant to use an application that the application tenant user wants to use, and not all applications are open to general users. Since the staff member can create an application tenant, the same procedure as for a general user is not required.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, in the present embodiment, each terminal device uses a general-purpose web browser, but a dedicated application may be used for the information processing system 50.

Further, the configuration examples illustrated in FIG. 5 and the like are divided according to the main functions in order to facilitate the understanding of the processing by the first terminal device 10, the second terminal device 20, the third terminal device 30, the electronic device 40, and the information processing system 50. The present disclosure is not limited by the way of dividing the processing unit or the name. The processing of the first terminal device 10, the second terminal device 20, the third terminal device 30, the electronic device 40, and the information processing system 50 can be divided into more processing units according to the processing content. Further, one processing unit can be divided so as to include more processing.

The apparatuses described in the examples are merely an illustration of one of several computing environments for implementing the embodiments disclosed herein. In some embodiments, information processing system 50 includes multiple computing devices, such as a server cluster. The plurality of computing devices is configured to communicate with one another through any type of communication link, including a network, shared memory, etc., and perform the processes disclosed herein.

Further, the information processing system 50 can be configured to share the disclosed processing steps, for example, the sequence diagram of FIG. 7 and the like in various combinations. For example, a process executed by a given unit may be executed by a plurality of information processing apparatuses included in the information processing system 50. Further, the information processing system 50 may be integrated into one server device or may be divided into a plurality of devices.

Each function of the embodiments described above can be implemented by one or a plurality of processing circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The invention claimed is:

1. A service providing system comprising:
an information processing system configured to assign use permission of at least one application of a plurality of applications to a first user registered in a first tenant; and
a terminal device configured to communicate with the information processing system, the information processing system including:
circuitry configured to:
create a second tenant, the second tenant being permitted to execute a first application of the plurality of applications,
create a third tenant, the third tenant being permitted to execute a second application of the plurality of applications,
receive, from a first user, authentication information of the first user;
authenticate the first user as a user of the first tenant based on the received authentication information of the first user;
receive, from the terminal device, a registration request including identification information of the authenticated first user and identification information of the first application or the second application;
register, based on the identification information of first application or the second application included in the registration request, the first user in the second tenant or the third tenant;
permit the first user to execute the first application when the first user is registered in the second tenant; and
permit the first user to execute the second application when the first user is registered in the third tenant.

2. The service providing system of claim 1, wherein the terminal device comprises circuitry configured to:
display on a display, information related to a user identified by successful authentication of the user; and
in response to an operation of registering a user to the second tenant, transmit identification information of the user identified by successful authentication of the user to the information processing system together with the identification information of the first application.

3. The service providing system of claim 1, further comprising:
an electronic device communicably connected to the information processing system, the electronic device including circuitry configured to:

display on a display of the electronic device, an application list screen of a plurality of applications registered in the second tenant received from the information processing system; and receive a selection of an application of the plurality of applications listed on the application list screen, and wherein the circuitry of the information processing system is further configured to, in response to receiving from the electronic device an authentication request designating identification information of the selected application, identification information of the first user, and authentication information, authenticating whether the first user can execute the selected application based on authentication information in the first tenant identified by the identification information of the first user.

4. The service providing system of claim 3, wherein the circuitry of the information processing system is configured to:

in response to receiving the authentication request including the identification information of the selected application, authenticate whether the first user is registered in the second tenant and is permitted to execute the selected application;

in response to receiving the authentication request not including the identification information of the selected application, authenticate whether the first user is registered in the first tenant; and issue a different authentication ticket depending on whether the first user is registered in the first tenant or registered in the second tenant.

5. The service providing system of claim 3, wherein the circuitry of the information processing system is further configured to:

store in one or more memories, default settings of the selected application in the first tenant; and in response to a successful authentication of the first user in the second tenant, transmit a screen of the selected application with the default settings to the electronic device.

6. The service providing system of claim 1, wherein the circuitry of the information processing system is configured to:

store in one or more memories, information indicating whether a second user has authority to register the first user and the first application in the second tenant; and register the first user and the first application in the second tenant based on the information indicating that the second user has authority.

7. The service providing system of claim 1, wherein the information processing system circuitry is further configured to:

receive, from a second user, an instruction to create the second tenant for the fast application;

create the second tenant for the first application in response to the instruction from the second user;

receive, from the second user, a request for registering the first user in the first tenant;

register the first user in the first tenant in response to the request from the second user for registering the first user in the first tenant;

authenticate the first user in response to registering the first user in the first tenant; and receive application identification information for the first application corresponding to the second tenant in response to the creation of the second tenant.

8. The service providing system of claim 1, wherein the second tenant and third tenant are created by a staff member who is a service provider of the first application and/or the second application.

9. An application usage method executed by an information processing system configured to assign use permission of at least one application of a of applications to a first user registered in a first tenant, the method comprising:

creating a second tenant, the second tenant being permitted to execute a first application of the plurality of applications;

creating a third tenant, the third tenant being permitted to execute a second application of the plurality of applications;

receiving, from a first user, authentication information of the first user;

authenticating the first user as a user of the first tenant based on the received authentication information of the first user;

receiving, from a terminal device, a registration request including identification information of the authenticated first user registered in the first tenant and identification information of the first application or the second application;

registering, based on the identification information of first application or the second application included in the registration request, the first user in the second tenant or the third tenant;

permitting, the first user to execute the first application when the first user is registered in the second tenant; and permitting the first user to execute the second application when the first user is registered in the third tenant.

10. An information processing system comprising circuitry configured to:

assign use permission of at least one application of a plurality of applications to a first user registered in a first tenant;

create a second tenant, the second tenant being permitted to execute a first application of the plurality of applications;

create a third tenant, the third tenant being permitted to execute a second application of the plurality of applications;

receive, from the first user, authentication information of the first user;

authenticate the first user as a user of the first tenant based on the received authentication information of the first user;

receive, from a terminal device, a registration request including identification information of the first user registered in the first tenant and identification information of the first application or the second application;

register, based on the identification information of first application or the second application included in the registration request, the first user in the second tenant or the third tenant;

permit the first user to execute the first application when the first user is registered in the second tenant; and permit the first user to execute the second application when the first user is registered in the third tenant.

* * * * *